United States Patent [19]

Izumi et al.

[11] Patent Number: 4,599,280
[45] Date of Patent: Jul. 8, 1986

[54] MAGNETIC RECORDING MEDIUM

[75] Inventors: Toshiaki Izumi; Kiyoshi Noguchi; Misao Kohmoto, all of Tokyo, Japan

[73] Assignee: TDK Corporation, Tokyo, Japan

[21] Appl. No.: 603,668

[22] Filed: Apr. 25, 1984

[30] Foreign Application Priority Data

Apr. 25, 1983 [JP] Japan .................................. 58-72585
Apr. 26, 1983 [JP] Japan .................................. 58-73531

[51] Int. Cl.$^4$ .............................................. G11B 5/64
[52] U.S. Cl. ........................... 428/694; 360/134; 360/135; 360/136; 427/132; 427/128; 428/900; 204/192 M
[58] Field of Search ............... 428/694, 900; 427/132, 427/131, 128; 360/134–136; 204/192 M

[56] References Cited

U.S. PATENT DOCUMENTS

| 4,323,629 | 4/1982 | Kunieda | 428/900 |
| 4,387,136 | 6/1983 | Saito | 428/900 |
| 4,407,894 | 10/1983 | Kadokura | 428/694 |
| 4,418,126 | 11/1983 | Izumi | 428/694 |
| 4,429,016 | 1/1984 | Sugita | 428/694 |
| 4,454,195 | 6/1984 | Fukuda | 428/694 |

FOREIGN PATENT DOCUMENTS 0152517  9/1982  Japan .................................. 428/694

OTHER PUBLICATIONS

Journal of Applied Physics, 36, No. 3, pp. 972-974 (1965).
The Fourth International Conference on Video and Data Recording IERE Conference Proceedings, No. 54.
Yasuo Iijima, Masatoshi Takao, and Akio Tomago, "Magnetic Properties of Evaporated Ferromagnetic Thin Films", Oct. 24, 1978, vol. 78, No. 151.

*Primary Examiner*—Ellis P. Robinson
*Attorney, Agent, or Firm*—Oblon, Fisher, Spivak, McClelland & Maier

[57] ABSTRACT

In a magnetic recording medium comprising a length of a non-magnetic plastic substrate and a magnetic thin layer of Co or Co-Ni or Co-Ni-Cr formed thereon, when the coercive force of the medium is measured by changing the measuring direction in a plane defined by a longitudinal direction of the substrate and a direction normal to the major surface of the substrate, the following relationship is met:

$$(Hc_{max} - Hc_{min})/Hc(0) \leq 0.9$$

where $Hc_{max}$ is the maximum coercive force, $Hc_{min}$ is the minimum coercive force, and $Hc(0)$ is a coercive force in the longitudinal direction of the substrate.

17 Claims, No Drawings

MAGNETIC RECORDING MEDIUM

BACKGROUND OF THE INVENTION

1. Field of the Invention

This invention relates to magnetic recording media, and more particularly, to magnetic recording media having a magnetic layer in the form of a continuous thin film formed by the so-called oblique incidence evaporation process.

2. Description of the Prior Art

Among magnetic recording media for use in video, audio and other applications, active research and development works have been made on magnetic recording media, usually magnetic tapes having a magnetic layer in the form of a continuous thin film because of the compactness of a roll of tape.

The preferred magnetic layers for such continuous film type media are deposited films of Co, Co-Ni, Co-O, Co-Ni-O and similar systems formed by the so-called oblique incidence evaporation process. Magnetic layers are formed on substrates by the oblique incidence evaporation process as a coalescence of columnar crystals which extend at an angle with respect to the normal to the major surface of the substrate and have a longitudinal diameter extending throughout the thickness of the magnetic thin layer. Cobalt and optional metals such as nickel and chromium form columnar structure particles themselves while oxygen, when added, is generally present on the surface of each columnar structure particle essentially in the form of oxides. These magnetic thin layers however undesirably develop a considerable difference in input and output characteristics depending on whether the media are transported forward or backward because of the shape anisotropy in the longitudinal direction of the substrate, that is, the direction of transport of the media.

SUMMARY OF THE INVENTION

The present invention provides a magnetic recording medium which develops a minimized input-output difference irrepective of whether it is transported forward or backward.

The present invention is directed to a magnetic recording medium comprising a length of a substrate and a magnetic thin layer formed thereon. According to a first aspect of the present invention, when coercive force is measured by changing the measuring direction in a plane defined by a longitudinal direction of the substrate and a normal direction to the major surface of the substrate, the following relation is met:

$$(Hc_{max} - Hc_{min})/Hc(0) \leq 0.9$$

where $Hc_{max}$ is the maximum coercive force, $Hc_{min}$ is the minimum coercive force, and $Hc(0)$ is a coercive force in the longitudinal direction of the substrate.

Preferably, the following relation is met:

$$(Hc_{max} - Hc_{min})/Hc(0) \leq 0.6$$

It has been found that none of currently available products and magnetic recording media reported in the literature have a ratio of $(Hc_{max} - Hc_{min})/Hc(0)$ of 0.9 or lower.

DETAILED DESCRIPTION OF THE INVENTION

The magnetic recording medium of the present invention has a magnetic layer on a substrate. The magnetic layer is of continuous thin film type coextending over the substrate and may be formed from any well-known composition, for example, Co alone, Co-Ni, Co-Cr, Co-Ti, Co-Mo, Co-V, Co-W, Co-Re, Co-Ru, Co-Mn, Co-Fe, Fe alone, or the like by any suitable process, for example, evaporation and ion plating.

In the preferred embodiment of the present invention, the magnetic layer is mainly based on cobalt and optionally contains at least one of nickel, chromium and oxygen. More particularly, the magnetic layer may consist essentially of cobalt alone or cobalt and nickel. When the layer consists essentially of cobalt and nickel, the weight ratio of Co/Ni is preferably at least about 1.5.

The magnetic layer may further contain oxygen in addition to cobalt or cobalt and nickel. The presence of oxygen contributes to further improvements in electromagnetic characteristics and runnability or durability. In this case, the atomic ratio of O/Co (when nickel free) or O/(Co+Ni) is preferably not more than about 0.45, and more preferably from about 0.02 to about 0.3.

More preferred results are obtained when the magnetic layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co +Ni) is preferably in the range of about 0.001 to about 0.1, and more preferably about 0.005 to about 0.05.

The magnetic layer may further contain trace elements, particularly transition metal elements, for example, Fe, Mn, V, Zr, Nb, Ta, Mo, W, Ti, Cu, Zn, etc.

The magnetic thin layer is generally formed to a thickness of about 0.05 to about 0.5 micrometers ($\mu$m), and preferably about 0.07 to 0.3 micrometers.

The magnetic layer preferably consists of a coalescence of crystalline particles of columnar structure oriented oblique to the normal to the substrate because of enhanced electromagnetic characteristics. More specifically, columnar crystal particles are preferably oriented at an angle of about 30 degrees or more with respect to the normal to the major surface of the substrate. Each columnar particle generally extends throughout the thickness of the magnetic layer and has a minor diameter of the order of 50 to 500 angstrom. Preferably, the columnar crystal particle is at a larger angle with respect to the normal to the major surface of the substrate on its side adjacent to the substrate than on its side remote from the substrate. Cobalt and optional metals such as nickel and chromium form the columnar crystal particles themselves while oxygen, when added, is generally present on the surface of each columnar crystal particle essentially in the form of oxides.

When the coercive force of the magnetic recording medium fabricated as described above is measured by changing the measuring direction in a plane defined by a longitudinal direction of the substrate and a direction normal to the major surface of the substrate, $Hc_{max}$, $Hc_{min}$, and $Hc(0)$ must satisfy the following relationship:

$$(Hc_{max} - Hc_{min})/Hc(0) \leq 0.9$$

At ratios exceeding 0.9, the magnetic recording media are not commercially acceptable because an input-output difference as high as 2 dB or more is developed when the direction of transport of the medium is reversed.

When the above-defined ratio is 0.6 or lower, the input-output difference is very small in both forward and backward directions and corrosion resistance is also improved. When the ratio is 0.4 or lower, the input-output difference becomes extremely small in both forward and backward directions and corrosion resistanace is remarkably improved.

The substrate which can be used in the medium of the present invention is not particularly limited as long as it is non-magnetic and may take the form of a length of tape. Particularly, flexible substrates are preferred, for example, substrates of polyester, polyimide, polypropylene and other resins. The thickness of the substrate varies over a wide range and is preferably in the range of about 5 to about 20 μm. The back surface of the substrate which is opposite to the magnetic layer-bearing surface may be coated with a backcoat layer of any well-known composition. The back surface of the substrate may preferably have a surface roughness or height irregularity of about 0.05 μm or more as expressed in RMS (root mean square) value because of improved travel properties.

The magnetic layer may be formed on the substrate either directly or via an undercoat layer. Further, the magnetic layer is generally formed as a single layer, but in some cases, it may be made up from a plurality of laminated sub-layers with or without an intermediate non-magnetic layer interposed therebetween. Also, the magnetic layer may be provided with a topcoat of any well-known composition.

The magnetic thin layer is preferably formed by any suitable deposition process, for example, evaporation, electric field evaporation, and ion plating, with the so-called oblique incidence evaporation process being most preferred. The oblique incidence evaporation process may be any of well-known techniques preferably using an electron beam gun while the minimum incident angle is preferably at least 20 degrees with respect to the normal to the substrate. Incident angles of less than 20 degrees result in inferior eleactromagnetic characteristics.

In carrying out evaporation, a cylindrical can is generally used to feed the substrate. A mask is properly disposed between the evaporation source and that portion of the substrate in contact with the can such that the material is deposited to the substrate at an incident angle of 20 to 90 degrees, and preferably 40 to 90 degrees with respect to the normal to the major surface of the substrate. The incident angle is preferably reduced as the magnetic layer is formed.

To achieve the angular dependency of coercive force as defined above, the evaporation apparatus may be properly arranged and controlled, for example, by placing a plurality of hearths or crucibles in a direction perpendicular to the feed direction of the substrate, that is, the width direction of the substrate and adjusting the rates of evaporation of the hearths, usually higher rates from lateral hearths than from the central one.

The remaining evaporation conditions are not particularly limited. The evaporation atmosphere may be an inert atmosphere of argon, helium, vacuum or the like as usually employed and have a pressure of about $10^{-5}$ to $10^0$ Pa. Evaporation distance, substrate feed direction, the structure and arrangement of the can and mask, and other factors may be selected from well-known conditions. Oxygen is preferably contained in the evaporation atmosphere to improve electromagnetic characteristics and corrosion resistance. In addition, oxygen may be introduced into the magnetic thin layer at any desired point during evaporation by a variety of techniques. Also, a variety of oxidizing treatments may be carried out on the magnetic layer at the end of formation of the magnetic layer.

A heat treatment may also be carried out at the end of formation of the magnetic layer in order to reduce the above-defined ratio of coercive force to 0.6 or lower.

The magnetic recording medium of the invention is very useful in video, audio, computer and other applications since it develops a minimal input-output difference irrespective of whether it is transported forward or backward. When the ratio of $(Hc_{max} - Hc_{min})/Hc(0)$ is 0.6 or lower, the magnetic recording medium exhibits improved corrosion resistance and experiences little deterioration in performance.

DESCRIPTION OF THE PREFERRED EMBODIMENTS

In order that those skilled in the art will better understand how the present invention is practiced, examples of the magnetic recording medium of the invention are given by way of illustration and not by way of limitation.

EXAMPLES

Example 1

Using cobalt alone, a Co-Ni alloy having a Co/Ni weight ratio of 4/1 and a Co-Ni-Cr alloy having a Co/Ni/Cr weight ratio of 65/30/5 as an evaporation source, a magnetic layer of 0.15 microns thick was formed on a long polyethylene terephthalate (PET) film of 10 microns thick and 100 mm wide by the oblique incidence evaporation process. The film or substrate was continuously fed by a can such that the incident angle of the evaporated material was gradually reduced from 90 degrees to 40 degrees with respect to the normal to the substrate as deposition proceeded. The distance between the evaporation source and the can was 200 mm. Evaporation was carried out in an atmosphere having an argon partial pressure of $5\times 10^{-3}$ Pa and optionally containing oxygen at $2\times 10^{-1}$ Pa.

Three hearths containing the evaporation source were used, one below the center of the substrate and the remaining two being oppositely spaced 200 mm from the central hearth in the width direction of the substrate. Each hearth had a liquid metal surface area of 25 cm$^2$. Evaporation was carried out by properly controlling the evaporation rates from the three hearths. The two side hearths were set to an equal evaporation rate while the ratio of the evaporation rate from the two side hearths to that from the central hearth was changed as shown in Table 1.

The values of $(Hc_{max}-Hc_{min})/Hc(0)$ of the thus prepared samples are shown in Table 1.

Each sample had a magnetic layer consisting of coalesced columnar crystal particles each extending throughout the thickness of the magnetic layer and at an angle with respect to the normal to the substrate. The columnar carystal particles were at a larger angle with respect to the normal to the substrate on their side adjacent to the substrate than on their top surface side.

Samples contained oxygen at an atomic concentration of O/Co or $O/(Co+Ni)=18$ to 20% when the atmosphere contained oxygen. When oxygen was not introduced, samples had an oxygen content of about 1 atom %.

Each sample was cut to a plurality of tapes having a width of ½ inches. A commercial VHS video deck was loaded with the tape cut from a central portion of the original sample. With inputs of the same level, outputs were measured at 4.5 MHz in both the forward and reverse transport directions to determine the difference between the maximum outputs in both the directions.

The results are shown in Table 1.

TABLE 1

| Sample No. | Composition | O$_2$ in atmosphere | Evaporation rate ratio, side/center | $Hc_{max}-Hc_{min}$ $Hc(0)$ | Output difference, dB |
|---|---|---|---|---|---|
| 1* | Co/Ni | no | 0/1 | 2.0 | 6.2 |
| 2* | Co/Ni | present | 0/1 | 1.8 | 5.0 |
| 3* | Co/Ni | present | 1/0 | 1.2 | 2.3 |
| 4 | Co/Ni | present | 2/1 | 0.9 | 0.7 |
| 5 | Co/Ni | present | 3/1 | 0.7 | 0.3 |
| 6* | Co | no | 3/1 | 1.4 | 2.8 |
| 7 | Co | present | 3/1 | 0.8 | 0.5 |
| 8* | Co/Ni/Cr | no | 3/1 | 1.3 | 3.2 |
| 9 | Co/Ni/Cr | present | 3/1 | 0.9 | 0.6 |
| 10 | Co/Ni/Cr | present | 4/1 | 0.7 | 0.2 |

*comparative examples

The data in Table 1 clearly shows the effect of the present invention.

Example 2

The procedure of Example 1 was repeated except that the samples obtained were further subjected to a heat treatment at 85° C. for 1 hour in air.

The output difference was measured in the same manner as in Example 1.

The corrosion resistance of samples was also determined. The samples were allowed to stand for 7 days at 60° C. and a relative humidity of 90%. A percent reduction in magnetic flux quantity ($\Delta\phi m/\phi m$, %) per square meter was measured.

The results are shown in Table 2.

TABLE 2

| Sample No. | Composition | O$_2$ in atmosphere | Evaporation rate ratio, side/center | $Hc_{max}-Hc_{min}$ $Hc(0)$ | Output difference, dB | $\Delta\phi m/\phi m$ % |
|---|---|---|---|---|---|---|
| 11* | Co/Ni | no | 0/1 | 1.2 | 2.3 | 40.3 |
| 12* | Co/Ni | present | 0/1 | 1.0 | 0.8 | 20.5 |
| 13 | Co/Ni | present | 1/0 | 0.7 | 0.3 | 2.5 |
| 14 | Co/Ni | present | 5/1 | 0.6 | 0.2 | 0.4 |
| 15 | Co/Ni | present | 3/1 | 0.4 | 0.1 | 0.1 |
| 16 | Co/Ni | present | 2/1 | 0.3 | 0.1 | 0.1 |
| 17 | Co | no | 3/1 | 0.8 | 0.4 | 9.6 |
| 18 | Co | present | 3/1 | 0.4 | 0.1 | 0.2 |
| 19 | Co/Ni/Cr | no | 3/1 | 0.7 | 0.3 | 2.7 |
| 20 | Co/Ni/Cr | present | 3/1 | 0.4 | 0.1 | 0.1 |

*comparative examples

What is claimed is:

1. In a magnetic recording medium comprising a length of a substrate and a magnetic thin layer formed thereon by the oblique incidence evaporation process, the improvement wherein when coercive force is measured by changing the measuring direction in a plane defined by a longitudinal direction of the substrate and a direction normal to the major surface of the substrate, the following relationship is met:

$$(Hc_{max}-Hc_{min})/Hc(0) \leq 0.9$$

wherein $Hc_{max}$ is the maximum of the coercive force,
$Hc_{min}$ is the minimum of the coercive force, and
$Hc(0)$ is a coercive force in the longitudinal direction of the substrate, wherein the magnetic layer consists essentially of Co alone or with at least another element selected from the group consisting of Ni, Cr and O, and comprises oxygen in an atomic ratio of O/metals of up to about 0.45.

2. The magnetic recording medium of claim 1 wherein the magnetic layer contains nickel in a weight ratio of Co/Ni of about 1.5 or higher.

3. The magnetic recording medium of claim 2 wherein the magnetic layer contains chromium in a weight ratio of Cr/Co or Cr/(Co+Ni) of about 0.001 to about 0.1.

4. The magnetic recording medium of claim 1 wherein the atomic ratio of O/Co or O/(Co+Ni) is between about 0.02 and about 0.3.

5. The magnetic recording medium of claim 1 of wherein the magnetic layer is about 0.05 to about 0.5 micrometers thick.

6. The magnetic recording medium of claim 1 wherein the magnetic layer comprises coalesced columnar crystal particles which extend at an angle with respect to the normal to the major surface of the substrate.

7. The magnetic recording medium of claim 6 wherein the columnar crystal particles are at a larger angle with respect to the plane normal to the major surface of the substrate on its side adjacent to the substrate than on its side remote from the substrate.

8. The magnetic recording medium of claim 1 wherein $$(Hc_{max} - Hc_{min})/Hc(0) \leq 0.6.$$

9. The magnetic recording medium of claim 8 wherein $$(Hc_{max} - Hc_{min})/Hc(0) \leq 0.4.$$

10. The magnetic recording medium of claim 1 wherein the magnetic thin layer is prepared by the oblique incidence evaporation process comprising the steps of:
    placing an evaporation source in an evaporation apparatus to extend in a direction transverse to the feed direction of the substrate, and
    controlling the rates of evaporation from a plurality of transversely spaced-apart points in the evaporation source such that the resulting magnetic thin layer may meet the coercivity relationship.

11. The magnetic recording medium of claim 10 wherein at least three evaporation points are arranged in the transverse direction with one at the widthwise center of the substrate, and the rate of evaporation from the lateral points is higher than that from the central point.

12. The magnetic recording medium of claim 11 wherein the ratio of the rate of evaporation from the lateral point to that from the central point ranges from 2/1 to 5/1.

13. The magnetic recording medium of claim 11 wherein the ratio of the rate of evaporation from the lateral point to that from the central point ranges from 1/0 to 5/1, and the thus deposited magnetic thin layer is further heat treated.

14. The magnetic recording medium of claim 1 wherein the magnetic thin layer is prepared by the oblique incidence evaporation process comprising the steps of:
    placing a plurality of evaporation sources in an evaporation apparatus in a direction transverse to the feed direction of the substrate, and
    controlling the rates of evaporation from the sources such that the resulting magnetic thin layer may meet the coercivity relationship.

15. The magnetic recording medium of claim 14 wherein at least three evaporation sources are arranged in the transverse direction with one at the widthwise center of the substrate, and the rate of evaporation from the lateral sources is higher than that from the central source.

16. The magnetic recording medium of claim 15 wherein the ratio of the rate of evaporation from the lateral source to that from the central source ranges from 2/1 to 5/1.

17. The magnetic recording medium of claim 15 wherein the ratio of the rate of evaporation from the lateral source to that from the central source ranges from 1/0 to 5/1, and the thus deposited magentic thin layer is further heat treated.

* * * * *